United States Patent [19]

Yamane et al.

[11] Patent Number: 5,059,266

[45] Date of Patent: Oct. 22, 1991

[54] APPARATUS AND METHOD FOR FORMING THREE-DIMENSIONAL ARTICLE

[75] Inventors: Mitsuo Yamane, Yotsukaichi; Takashi Kawaguchi, Nishikasugai; Shigeru Kagayama, Nagoya; Shunichi Higashiyama, Yotsukaichi; Keiko Suzuki, Okazaki; Jun Sakai, Nagoya; Mikio Imaeda, Bisai; Kouji Inaishi, Okazaki, all of Japan

[73] Assignee: Brother Kogyo Kabushiki Kaisha, Japan

[21] Appl. No.: 527,286

[22] Filed: May 23, 1990

[30] Foreign Application Priority Data

| May 23, 1989 | [JP] | Japan | 1-127848 |
| May 23, 1989 | [JP] | Japan | 1-127850 |
| May 24, 1989 | [JP] | Japan | 1-128686 |
| May 24, 1989 | [JP] | Japan | 1-128687 |
| May 24, 1989 | [JP] | Japan | 1-128688 |
| May 24, 1989 | [JP] | Japan | 1-128689 |
| May 25, 1989 | [JP] | Japan | 1-130079 |
| May 25, 1989 | [JP] | Japan | 1-130080 |
| Jul. 6, 1989 | [JP] | Japan | 1-174777 |

[51] Int. Cl.$^5$ .......................... B05B 7/24; B05D 5/06; B29C 41/52; B32B 31/28
[52] U.S. Cl. .......................... 156/64; 118/50.1; 118/313; 118/315; 118/316; 118/624; 118/698; 118/712; 156/155; 156/242; 156/272.2; 156/275.5; 156/307.1; 156/378; 156/379.6; 156/500; 264/22; 264/24; 264/40.1; 264/40.7; 264/245; 264/246; 264/255; 264/308; 264/317; 364/468; 364/522; 425/73; 425/135; 425/145; 425/150; 425/161; 425/174.4; 425/225; 425/375; 427/8; 427/27; 427/54.1; 427/385.5; 427/393.5; 427/407.1; 427/412.1

[58] Field of Search ................. 264/22, 24, 40.1, 40.7, 264/132, 219, 236, 245, 246, 255, 308, 347; 425/73, 135, 145, 150, 161, 174, 174.4, 175, 225, 375; 156/64, 242, 273.3, 273.5, 275.5, 307.1, 378, 379.6, 500; 427/8, 12, 27, 54.1, 407.1, 412.1; 118/50.1, 300, 313, 315, 316, 620, 624, 698, 712; 101/35, 450.1, 483; 346/1.1, 140 R; 364/468, 474.05, 474.24; 400/126

[56] References Cited

U.S. PATENT DOCUMENTS

| 4,400,705 | 8/1983 | Horike | 346/140 R X |
| 4,408,211 | 10/1983 | Yamada | 346/140 R X |
| 4,603,726 | 8/1986 | Pfannenstiel et al. | 164/35 |
| 4,641,270 | 2/1987 | Lalloz et al. | 364/468 X |
| 4,665,492 | 5/1987 | Masters | 364/468 |
| 4,906,170 | 3/1990 | Nelson et al. | 264/132 X |
| 4,942,000 | 7/1990 | Penoyer | 264/22 |

FOREIGN PATENT DOCUMENTS

| 451012 | 7/1936 | United Kingdom . |
| 957217 | 5/1964 | United Kingdom . |
| 1286154 | 8/1972 | United Kingdom . |
| 1384003 | 2/1975 | United Kingdom . |
| 1532703 | 11/1978 | United Kingdom . |
| 1564062 | 4/1980 | United Kingdom . |

*Primary Examiner*—Leo B. Tentoni
*Attorney, Agent, or Firm*—Oliff & Berridge

[57] ABSTRACT

An apparatus and a method for forming a three-dimensional article with photosetting or thermosetting material on the basis of a three-dimensional information on the article by means of an ink jet method. The material is jetted from at least one ink jet head to a stage and laminated thereon. The laminated material is exposed to light by a light source to be cured. In this process, a jetting direction of the material from the ink jet head to the stage and/or a jetting amount of the material jetted from the ink jet head is changed in accordance with the information by a control unit, thereby forming a solid article having a desired three-dimensional shape.

19 Claims, 10 Drawing Sheets

APPARATUS AND METHOD FOR FORMING THREE-DIMENSIONAL ARTICLE

BACKGROUND OF THE INVENTION

This invention relates to an apparatus and a method for forming a solid or three-dimensional article, and more particularly to an apparatus and a method for forming a three-dimensional article in which photosetting or thermosetting material is jetted by an ink jetting method, and cured by applying light or heat to the material while sequentially or intermittently laminated on a stage, thereby to form a solid or three-dimensional article on the stage.

There has been conventionally utilized an apparatus for forming a three-dimensional article such as a mold for an injection molding process or the like.

In the conventional apparatus as shown in FIG. 1, a three-dimensional model for a solid article (a three-dimensional information on the article) is beforehand obtained by means of CAD (Computer Aided Design). The three-dimensional model is sliced into plural thin sectional layers (informations) each representing each of plural sectional articles whose assembly constitutes the solid or three-dimensional article. In accordance with data of each thin sectional layer, a control computer 61 drives an X, Y-axes control device 62 for controlling a movement of a laser source 64 on a X-Y plane and a Z-axis control device 63 for controlling a movement of the laser source 64 in the Z-direction. Simultaneously with the driving of the X, Y-axes control device 62 and the Z-axis control device 63, the laser light source 64 irradiates a laser beam to the surface of liquid photosetting resin 66 accommodated in a tank 65 while scanning the surface of the photosetting resin 66 and drawing a pattern representing the sectional shape of each sectional article on the liquid surface of the resin 66 in accordance with the data from the control computer 61 with the laser beam. A table 68 is provided in the tank 65 in such a manner as to be disposed beside the surface of the resin 66. The laser beam is irradiated toward the table, and thus the photosetting resin 66 which is exposed to the laser beam is phase-changed from liquid to solid on the table 68, that is, the photosetting resin 66 is cured on the table 68 by the laser beam, so that a sectional article corresponding to one sectional layer of the sliced three-dimensional model is formed of the resin on the table 68 in the tank 65.

The table 68 is moved downwardly (in the Z-direction) by a distance corresponding to the thickness of one sectional article, and the above process is repeated to form a next sliced sectional article on the previously formed sliced article. A number of sliced sectional articles are sequentially formed and laminated by the above process, so that a cured solid article 69 is finally formed on the table 68.

In the conventional apparatus thus constructed, as described above, the liquid photosetting resin is accommodated in the tank and the laser beam is applied to the photosetting resin accommodated in the tank. Therefore, the material such as photosetting resin for the article to be formed is limited to only a single material. This limitation of the material also causes the color of the article to be limited to one color. If the material of the article or the color thereof is required to be changed on the way of the process, it is necessary to discharge the whole liquid photosetting resin from the tank and exchange it for a new one. Accordingly, in this case, a cleaning process for the inside of the tank is further required. This cleaning process causes a loss of time and unnecessary cost. Further, it is very difficult to control polymerization of the resin in such an apparatus.

Further, as a conventional method for manufacturing a simple mold for forming a resin article in a molding process, there has been a precise molding method (lost-wax process) in which refractory latex (slurry) and sand are coated around a prototype formed of wax or the like several times and then supplied with heat and pressure to melt the wax and discharge the melted wax to an outside.

The lost-wax process requires a step for forming the prototype by injection molding, cutting and other operations. The injection molding operation requires a metal mold, and thus time and cost are increased. Further, the cutting operation causes the prototype to be easily soiled with oil or scraps and a whole cost to be heightened. Still further, the lost-wax process imposes a risk on workers because the process is carried out at a high temperature, and thus the lost-wax process brings about a problem for health and so on.

SUMMARY OF THE INVENTION

An object of this invention is to provide an apparatus and a method capable of easily and accurately forming a multi-kind or multi-color three-dimensional article for a short time and at a low cost even if plural materials of different kinds or colors are used.

Another object of this invention is to provide an apparatus and a method for forming a three-dimensional article capable of preventing dripping and blurring of materials used for the article during a laminating process thereof and clogging of the materials in an ink jet head.

Still another object of this invention is to easily and safely manufacture a simple mold for a short time and at a low cost without forming the prototype.

In order to attain the above objects, according to one aspect of this invention, an apparatus for forming a three-dimensional dimensional article with curable material on the basis of a three-dimensional information on the article, comprises a stage for mounting thereon the three-dimensional article to be formed, an ink jet head unit for sequentially or intermittently jetting the curable material in a droplet form along a flight passage of the material to the stage to laminate the curable material on the stage, the flight passage being defined between the stage and the ink jet head unit, an exposure unit for exposing the laminated material on the stage to light to cure the material and a control unit for changing at least one of a jetting direction of the material jetted along the flight passage and a jetting amount of the material jetted from the ink jet head unit on the basis of the information to thereby control a jetting operation of the material. The article may be a mold used for a molding process.

In the three-dimensional article forming apparatus thus constructed, the material preferably comprises a photosetting or thermosetting resin, and the ink jet head unit is disposed under the stage in such a manner as to upwardly jet the resin to the stage.

According to another aspect of this invention, a method for forming a three-dimensional article with curable material on the basis of a three-dimensional information on the article, comprises the steps of jetting the material along a flight passage of the material to a stage to thereby laminate the material on the stage, changing at least one of a jetting direction of the material along the flight passage and a jetting amount of the material, thereby controlling a jetting operation of the material, and exposing the laminated material to light to cure the material, thereby forming the article. The article may be a mold used for a molding process.

According to this invention, since plural ink jet heads are provided, a resin material for the three-dimensional article can be exchanged for another even during an article forming process. Further, as the resin is jetted in a droplet form, polymerization of the resin is easily controlled.

Moreover, according to this invention, since the ink jet head is disposed under the stage, the resin is jetted from a downward side to an upward side and is photocured every jetting process. Accordingly, there is an advantage that a resin for which the previously used resin is exchanged in the course of the process is not mixed with the previously used resin, and thus the forming process is accurately performed with no drop of the resin.

DETAILED DESCRIPTION OF THE INVENTION

Preferred embodiments of this invention will be described hereunder with reference to the accompanying drawings.

Figure 1:
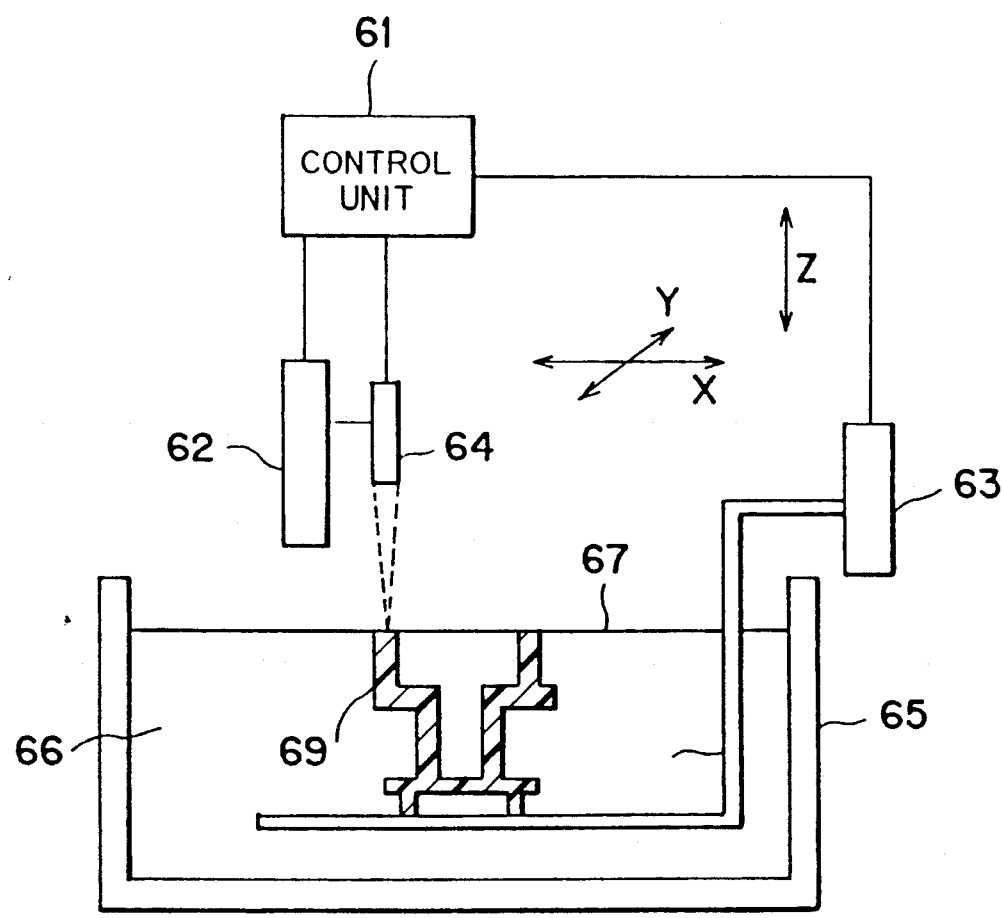
FIG. 1 is a schematic view of a conventional three-dimensional article forming appratus.
Figure 2:
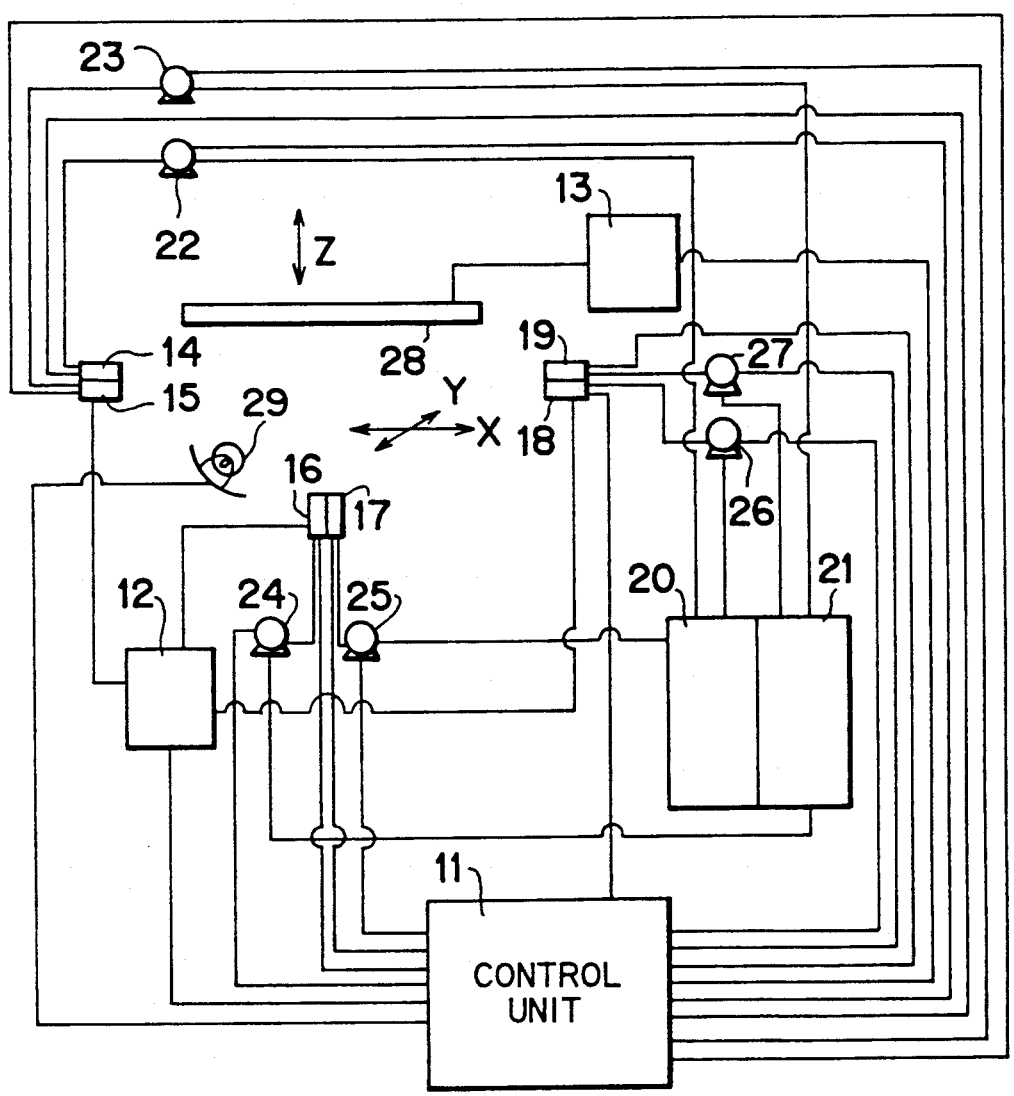
FIG. 2 is a schematic view of a first embodiment of a three-dimensional article forming apparatus according to this invention.

A three-dimensional article forming apparatus according to a first embodiment is shown in FIG. 2, and basically comprises a control unit 11 comprising a computer for obtaining a three-dimensional model on the basis of an input information on a desired article and controlling each element of the apparatus for performing a forming process in accordance with data on the model, a forming stage 28 on which a material such as photosetting resin is laminated to form a three-dimensional (solid) article thereon, a light source 29 for supplying light to the laminated photosetting resin and curing the resin, an ink jet head unit having plural ink jet heads 14 to 19 for jetting the photosetting resin to the stage 28, an X, Y-axes control device 12 for controlling a movement of the ink jet head unit in the X-controlling and Y-directions (on the X-Y plane) and a Z-axis control device 13 for controlling a movement of the forming stage in the Z-direction, the X, Y-axes and Z-axis control devices 12 and 13 being used to control jetting and laminating directions of the photosetting resin, resin tanks 20 and 21 for accommodating the photosetting resin, and pumps 22 to 27 for providing the photosetting resin in the tanks 20 and 21 to the ink jet head unit.

Figure 6:
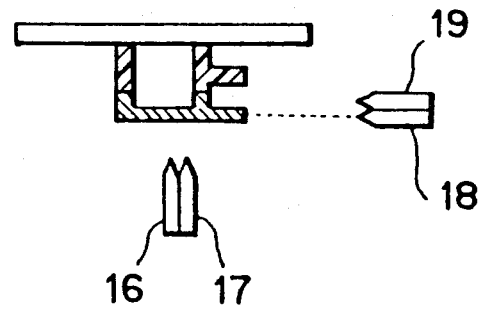

An operation of the apparatus according to this embodiment will be described hereunder, for example, in a case where an article as shown in FIG. 6 is formed.

Figure 3:
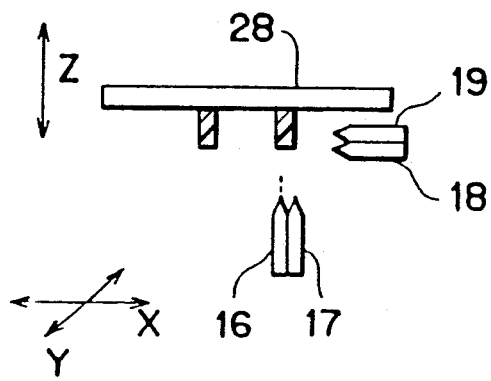
FIGS. 3 to 6 are explanatory views for forming an article using the apparatus as shown in FIG. 2.

At a first stage, data on each sectional shape of a desired article is input to the control unit 11. On the basis of an instruction from the control unit 11, the X, Y-axes control device 12 and the Z-axis control device 13 are driven to move the ink jet heads 14 to 19 and the forming stage 28 disposed above the ink jet heads to predetermined positions, respectively. After these elements are moved, the control unit 11 outputs an instruction to the pump 24 to jet photosetting resin A accommodated in the tank 21 from the ink jet head 16 to the forming stage 28 while the ink jet head 16 is moved in the X- and Y-directions, and to laminate the jetted photosetting resin on the forming stage 28. Thereafter, the laminated photosetting resin is exposed to light by the lightsource 29 to be photocured, so that a first part of the article as shown in FIG. 3 is obtained on the stage 28.

Figure 4:
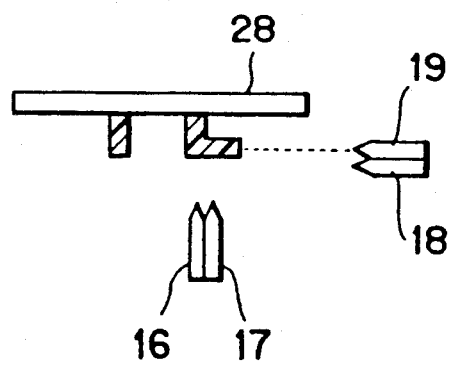
Figure 5:
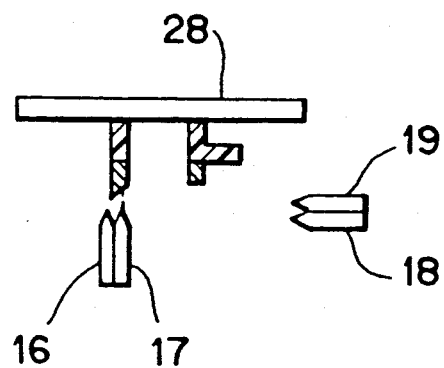

At a next stage, the control unit 11 outputs another instruction to the pumps 23 and 27 to jet the photosetting resin A accommodated in the tank 21 from the ink jet heads 15 and 19 to the stage 28 while the ink jet heads 15 and 19 are moved in the X- and Y-directions (in this embodiment, it is not necessary to jet the photosetting resin from the ink jet head 15 because of the shape of the article to be formed). The photosetting resin is laminated on the previously-photocured first part and then photocured by irradiating the light to the resin from the light source 29, so that a second part as shown in FIG. 4 is formed on the first part. Further, in accordance with another instruction from the control unit 11, the forming stage 28 is moved in the Z-direction by a distance corresponding to the thickness of each sectional article, and the ink jet heads 16 and 17 are moved in the X- and Y-directions. Thereafter, the photosetting resin B accommodated in the tank 20 is jetted from the ink jet head 17 while the ink jet head 17 is moved in the X- and Y-directions, and laminated on the previously photocured first and second parts. The photosetting resin is photocured by the light-radiation from the light source 29 to form a third part as shown in FIG. 5 on the first and second parts.

At a last stage, the control unit 11 outputs another instruction to the pumps 22 and 26 to jet the photosetting resin B accommodated in the tank 20 from the ink jet heads 14 and 18 to the stage 28 while the ink jet heads 14 and 18 are moved in the X- and Y-directions (in this embodiment, it is not necessary to jet the photosetting resin from the ink jet head 14 because of the shape of the article to be formed), and then the photosetting resin is laminated on the previously photocured third part. The photosetting resin is photocured by the light-radiation from the light source 29 to form a fourth part as shown in FIG. 6, that is, the desired article as shown in FIG. 6 is formed on the stage 28 and the forming process is completed. In the above embodiment, the photosetting resins A and B may be different in kinds and/or colors from each other.

It is necessary in this embodiment that the photosetting resins A and B are selected in consideration of viscosity, rate of reaction, efficiency of reaction and so on. The photosetting resin includes photopolymerizable prepolymer as a main component, photopolymerizable monomer, photopolymerization initiator and coloring material. The following materials are preferably used in this embodiment.

As the polymerizable prepolymer, polyester acrylate, epoxy acrylate, polyurethane acrylate or the like may be suitably used. As the polymerizable monomer, 1, 6-hexanediol acrylate, diethylene glycol diacrylate, neopenthyl glycol diacrylate or the like may be suitably used, and as the polymerization initiator, benzophenone, Micheler's ketone, thioxantone, salt of aryl iodonium, salt of aryl sulfonium, iron-allene compound or the like may be suitably used. Further, well-known dye or pigment may be used as the coloring material. A photosensitizer, a stabilizer and a reactive dilute are mixed with each other in a suitable mixing ratio.

Various modifications may be made to the above embodiment insofar as these modifications do not depart from the subject matter of this invention. For example, if a CAD/CAM/CAE system is introduced into the control unit 11 as described above, it is possible to increase a speed for the forming process and to improve a quality in design.

In the above embodiment, the ink jet head unit comprises three arrays of ink jet heads, each of which comprises two ink jet heads for jetting the different photosetting resins A and B accommodated in the tanks 20 and 21. However, the number of ink jet heads constituting an array and the number of the arrays constituting the ink jet head unit are not limited to the above embodiment.

Figure 7:
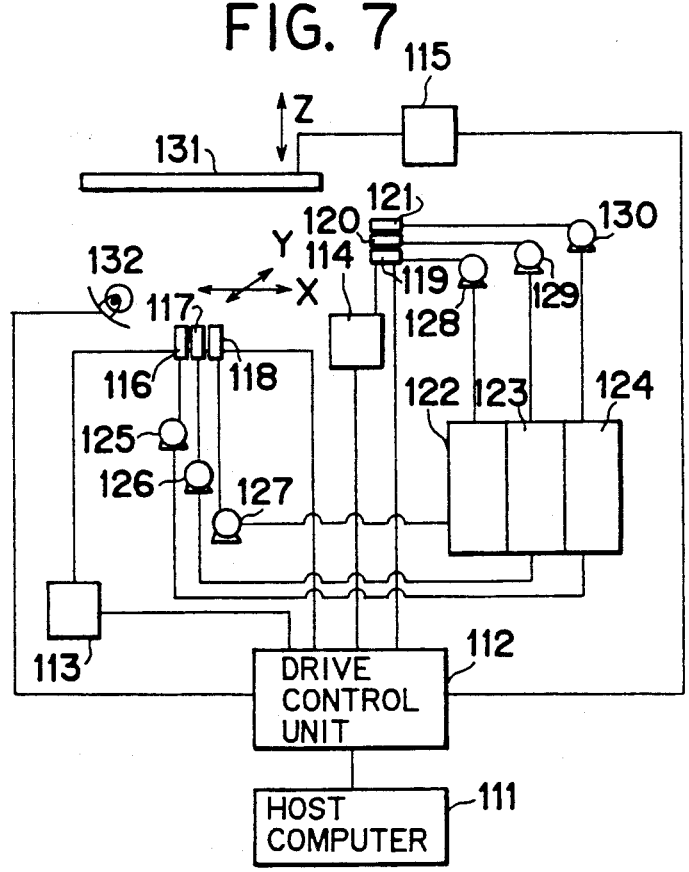
FIG. 7 is a schematic view of a second embodiment of the three-dimensional article forming apparatus according to this invention.

FIG. 7 is an explanatory diagram for showing a second embodiment of the three-dimensional article forming apparatus according to this invention.

The construction and operation of the apparatus as shown in FIG. 7 is substantially similar to that of the apparatus as shown in FIG. 2, except for some elements. The three-dimensional article forming apparatus of this embodiment is capable of forming a multi-kind three-dimensional article formed of different kinds of resin, a multi-color three-dimensional article having plural colors, or a three-dimensional article having an arbitrary mixed color.

The three-dimensional article forming apparatus of this embodiment basically includes ink jet heads 116 to 121 for jetting different kind or color photosetting resins respectively, resin tanks 122 to 124 for accommodating the different kind or color photosetting resins, pumps 125 to 130 for supplying the photosetting resins accommodated in the tanks 122 to 124 to the respective ink jet heads 116 to 121, a forming stage 131 and a light source 132 for photocuring the resin, a control unit 111 comprising a host computer for forming a three-dimensional model and slicing the model into data of plural thin sectional parts, a drive control unit 112 for receiving data of the sectional parts from the control unit 111 and controlling various elements for performing a forming process in accordance with the data, an X, Y-axes control device 113 for controlling a movement of the ink jet heads 116 to 118 in the X- and Y-directions, a rotational movement control device 114 for controlling a rotational movement of the ink jet heads 119 to 121 around the forming stage 131, and a Z-axis control device 115 for controlling a movement of the forming stage 131 in the Z-direction. The X, Y-axes control device 113, the rotational movement control device 114 and the Z-axis control device 115 are used to change a jetting direction of the photosetting resin from the ink jet heads to the stage 131 in accordance with a control signal from the drive control unit 112. In the host computer, coordinate data representing the positions of the sectional parts, kind data representing the kinds of the resins to be used at the positions and color data representing the colors to be used at the positions are obtained on the basis of model.

An operation of the apparatus will be described hereunder.

The three-dimensional model which is obtained in the control unit 111 is sliced into the plural thin sectional parts, and the coordinate data is obtained in correspondence to each sectional part. In addition to the above process, for a color three-dimensional model, color data of the model is also obtained, and/or for a three-dimensional model to which plural different kind resins are used, kind data of the model is also obtained. These data are transmitted to the drive control unit 112. In accordance with the data, the X, Y-axes control device 113, the rotational movement control device 114 and Z-axis control device 115 are driven by the drive control unit 112, and the ink jet heads 116 to 121 and the forming stage 131 disposed above these ink jet heads are moved to predetermined positions. Thereafter, instructions are output from the control unit 111 through the drive control unit 112 to the ink jet heads 116 and 119, or the ink jet heads 117 and 120, or the ink jet heads 118 and 121, or the ink jet heads 116, 117, 120 and 121, or the ink jet heads 117, 118, 119 and 120, or all ink jet heads 116 to 121, that is, to any combination of the ink jet heads of the two arrays, and then one of the photosetting resins accommodated in the corresponding resin tanks 122 to 124 is jetted through one of the pumps 125 to 130 to the stage.

The respective resin tanks 122 to 124 accommodate different kind or different color photosetting resins therein, so that a multi-kind or multi-color article formed of plural kind or color resins is obtained. Drops of the photosetting resin jetted from the ink jet head are laminated on the stage 131 to form a layer, and then the layer is photocured by light-radiation of the light source 132. The above jetting operation is repeated for the ink jet heads 116 to 118 disposed under the forming stage 131 and the ink jet heads 119 to 121 at the side of the forming stage 131, thereby obtaining a multi-kind article formed of a number of kind of resins, or an article of multi-color or an arbitrary mixing color. Like the first embodiment, this embodiment also adopts the same materials as the photopolymerizable prepolymer, photopolymerization monomer, photopolymerization initiator and the coloring material, and a photosensitizer, a stabilizer and a reactive dilute are mixed with each other in a suitable mixing ratio.

Any modifications may be made to the above embodiment insofar as the modifications do not depart from subject matter of this invention. For example, the numbers of the ink jet heads constituting one array and the tanks are not limited to those of FIG. 7. That is, the number of the kinds or colors of the photosetting resins which are used for forming the article is not limited to that of FIG. 7. For example, by using plural arrays each having four ink jet heads for yellow, magenta, cyan and black colors, a multi-color three-dimensional article can be obtained. In this case, four tanks for accommodating the photosetting resins of the above four colors are used.

In the three-dimensional forming apparatuses as described above, in order to jet the photosensitive resin in a droplet form from the ink jet head, it is necessary for the photosetting resin to have a small viscosity because the photosetting resin is clogged in the head if the resin has a large viscosity. Inversely, if the article is formed of the photosetting resin having a small viscosity, a problem occurs that the photosetting resin after lamination falls in drops during the photocuring process, and/or the different kind or color resins are mixed or contaminated with one another at boundaries of these resins.

The following embodiment can overcome the above disadvantage.

Figure 8:
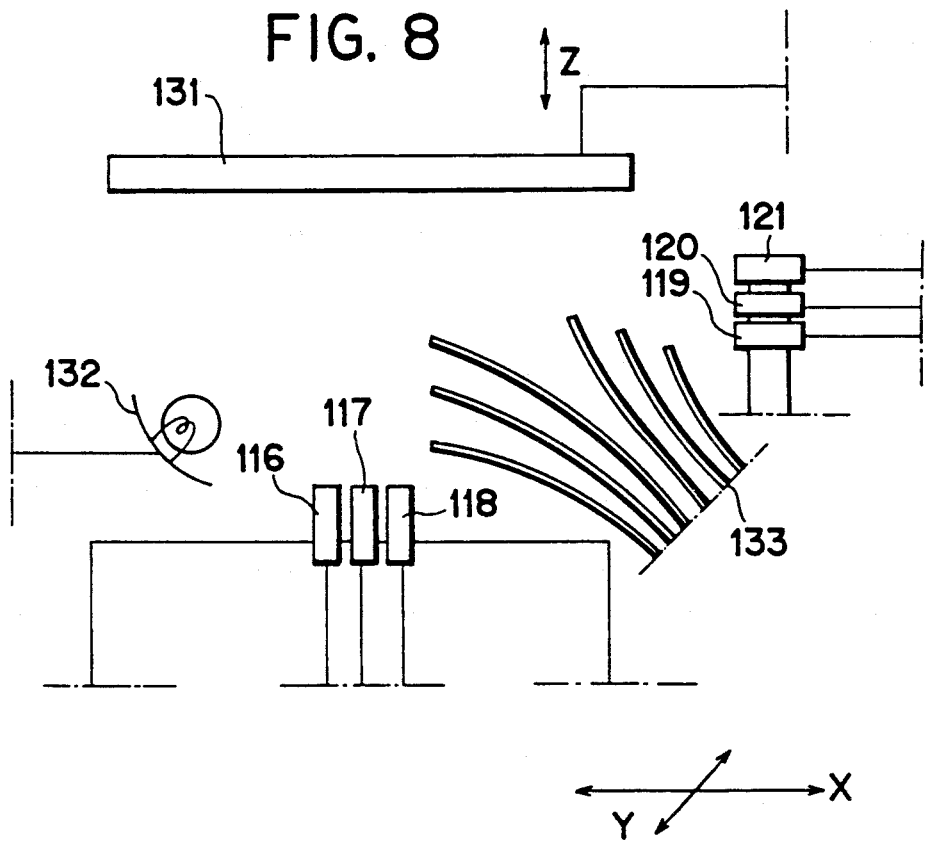
FIG. 8 is an enlarged view of an auxiliary exposure unit used in the apparatus according to this invention.

The three-dimensional article forming apparatus of this embodiment has a basically same construction as that of the three-dimensional article forming apparatus as shown in FIG. 7, and further includes auxiliary exposure means 133 for irradiating light to a flight passage of the drops of the photosetting resin during a flight period of the drops of the photosetting resin from the ink jet head to the forming stage 131 as shown in FIG. 8. The auxiliary exposure means 133 comprises, for example, plural optical fibers disposed in such a manner that one end of each confronts the flight passage of the photosetting resin in which the drops of the photosetting resin flights from the ink jet head to the forming stage 131. A light source (not shown) for emitting light is disposed beside the other ends of the optical fibers in such a manner as to confront the other ends of the optical fibers. The light emitted from the light source has a wavelength which is matched with a photocuring sensitivity of the photosetting resin jetted from the respective jet heads.

An operation of the three-dimensional article forming apparatus of this embodiment is also substantially similar to that of the ink jet type of three-dimensional article forming apparatus as described above. However, in this embodiment, the photosetting resin having a low viscosity is used and the photosetting resin jetted from the ink jet heads are beforehand photocured to an arbitrary extent by the auxiliary exposure means 133 during the flight period thereof from the ink jet heads to the forming stage, and then are laminated on the forming stage every layer. Thereafter, the light source 132 exposes the laminated photosetting resin to light, thereby to completely photocure the laminated photosetting resin. This process is repeated until a desired article is formed on the forming stage. The auxiliary exposure means 133 may be designed so as to irradiate the light in a multi-step fashion using a glass fiber or the like.

According to this embodiment, the drops of the photosetting resin jetted from the ink jet head are partly photocured during the flight period thereof, and then laminated and completely photocured. As a result, the photosetting resin is prevented from clogging in the ink jet head because the photosetting resin itself has a low viscosity, so that a cost for maintenance is reduced, and the article is accurately formed without dripping, blurring and so on because the photosetting resin is partly photocured during the flight period thereof. Particularly, when plural different kind or color resins are used, the mixing or contamination of the resins is prevented at the boundaries where the kind or color of the resin is changed. Therefore, the resin article having a sharp color contrast or the like can be obtained.

This embodiment is not limited to the construction as described above, and any modifications may be made insofar as the modifications do not depart from the subject matter of this invention.

In the apparatus as described above, a material having a low viscosity is used as the photosetting material in order to prevent the clogging of the resin in the ink jet head. The clogging itself of the resin in the ink jet head can be prevented using a material (resin) having a low viscosity. However, as described above, the material having a low viscosity causes the dripping and blurring of the material on the forming stage.

The following embodiment can prevent the clogging of the material in the ink jet head even when the material having the low viscosity is not used.

Figure 9:
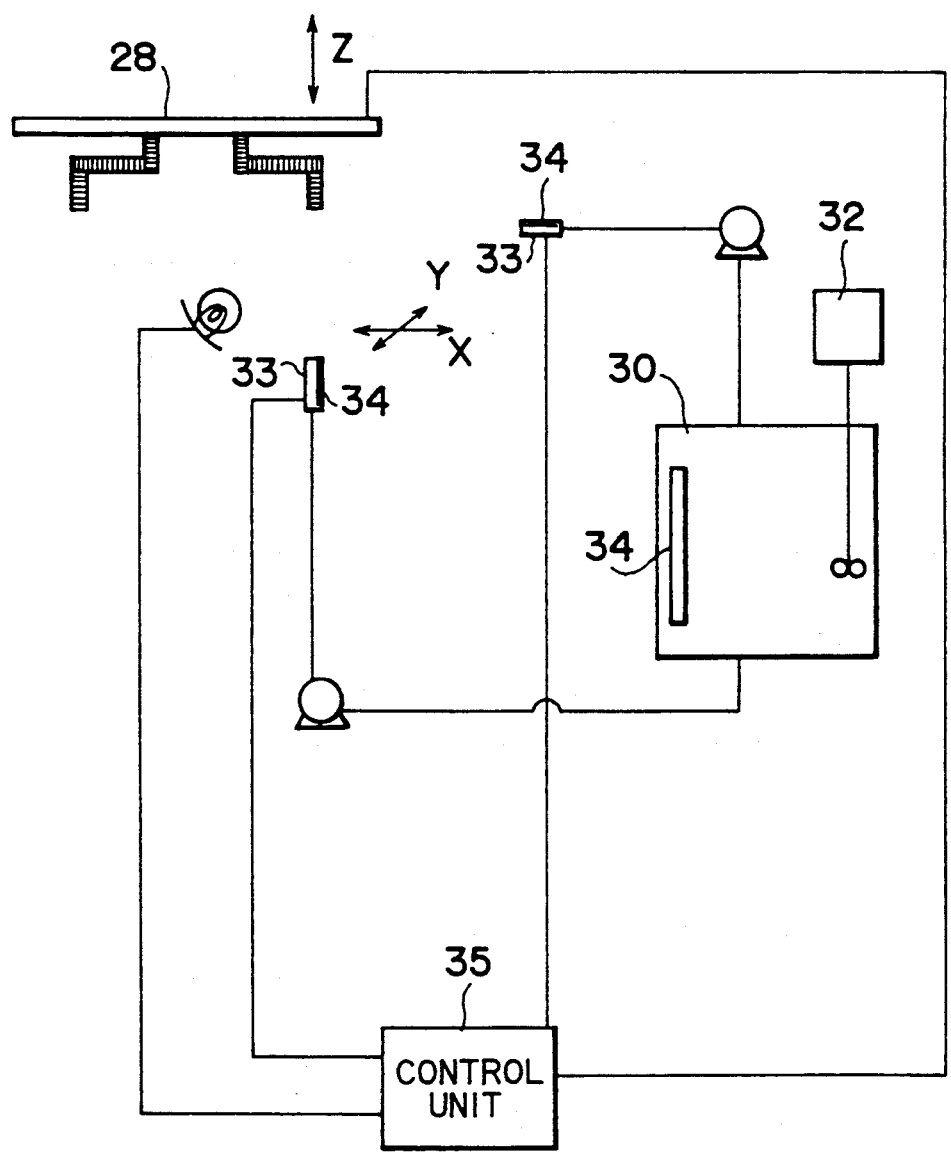
FIG. 9 is a schematic view of a third embodiment of the three-dimensional article forming apparatus according to this invention to which oscillating means is provided.

The three-dimensional article forming apparatus of this embodiment is shown in FIG. 9, and the same elements as those of FIG. 7 are represented by the same reference numerals. In FIG. 9, the elements which do not directly pertain to this embodiment are eliminated from FIG. 9 to make an understanding of this embodiment more clear.

In this embodiment, a photosetting material having thixotropic property is used as the material for forming an article. The material such as photosetting resin or the like which is accommodated in a tank 30 mainly includes a well-known photosetting material (for example, UV(ultraviolet)-curing polyester, urethane, epoxy, polyether, acryl or the like. Polymerization initiator, photosensitizer and so on may be added). In order to enhance the thixotropic property, the photosetting material is dispersed in a fine particle form in water or organic solvent, or is added with various additives having large polarity (for example, a gelling agent such as metallic soap, alkyd resin or the like, colloidal particles such as fine powder of silica, calcium carbonate bentonite, organic bentonite or the like, polyamide resin or the like).

In order to enhance the fluidity of the material, the material is stirred by a stirrer 32, and/or the materials in the ink jet head 33 and tank 30 are oscillated by an oscillator 34 comprising a piezoelectric element or the like to cut the weak intermolecular bonding of the material and liquefy the material into a sol state until it is jetted from the ink jet head 33 to thereby easily jet the material from the ink jet head 33. After the material is jetted to and laminated on the forming stage 28, the material is gelled and thus the dripping and blurring of the material hardly occur. The laminated material is exposed to light and photocured by a light source, so that an article is formed with high accuracy.

According to the three-dimensional article forming apparatus thus constructed, the material having the thixotropic property is gel when it is unused. When the material is used, the material is oscillated or stirred to be sol, and then is jetted from an ink jet head through a pump, laminated and cured. After lamination, the forming material is rapidly returned to the gel state and therefore the forming process is highly accurately performed with no dripping and blurring. Further, during a jetting operation of the material, the material is at a sol state and therefore it is easily jetted from the ink jet head, so that no clogging of the material occurs in the ink jet head. Therefore, in this embodiment, no material having low viscosity is not necessarily used and thus no dripping and blurring of the photosetting material occur on the forming stage. Accordingly, an element such as the auxiliary exposure means as shown in FIG. 8 is not necessary in this embodiment.

This embodiment is not limited to the above-described construction, and various modifications may be made insofar as the modifications do not depart from the subject matter of this invention. For example, in place of the photosetting material such as photosetting resin, a thermosetting material such as thermosetting resin may be used to obtain the same effect.

In the three-dimensional article forming apparatuses as described above, the ink jet heads must have a small jetting amount when plural different kind or color of photosetting resins are used to form a multi-kind or multi-color three-dimensional article because it is necessary to accurately control the kind or color of the article in correspondence to fine parts of the article and to carry out a real subtractive mixing process, because such an operation needs a fine jetting operation of the materials to be used for the article. Therefore, a long time is required for forming a part of the article having a broad area in the same color or for forming a visually-hidden bulky part of the article, and the efficiency for the process is poor.

The following embodiment can overcome the above disadvantage.

The three-dimensional article forming apparatus of this embodiment has a substantially similar construction of the three-dimensional article forming apparatus as shown in FIG. 7, except for the ink jet head unit, and thus description of the same elements as these of FIG. 7 is eliminated.

Figure 10:
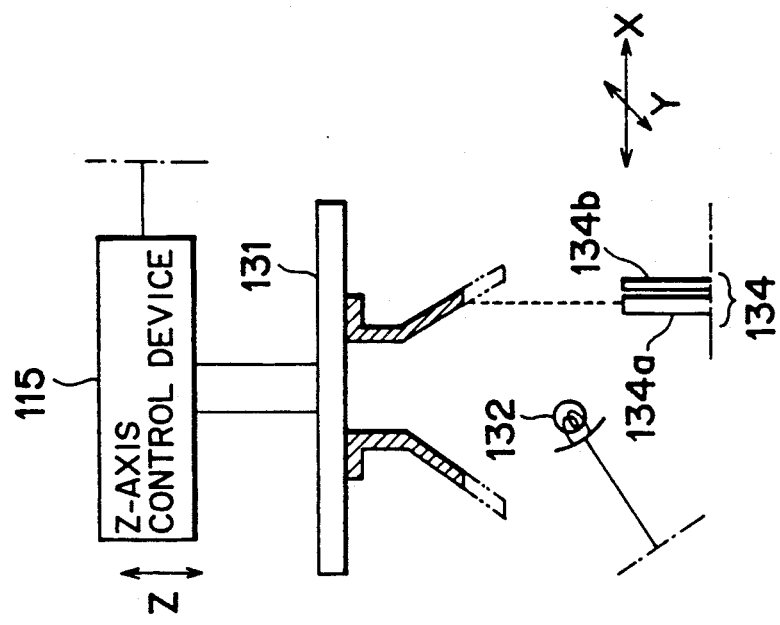

In this embodiment, each ink jet head for jetting a different kind or color of photosetting resin includes plural heads having different jetting amounts for the photosetting resin. As shown in FIG. 10, an ink jet head 134 for jetting each photosetting resin comprises a first head 134a having a large jetting amount for the photosetting resin and a second head 134b having a small jetting amount for the photosetting resin.

In accordance with instructions from the control unit 111 and the drive control unit 112, the forming stage 131 is moved in the Z-direction by the Z-axis control device 115. Similarly, the ink jet head 134 is moved in the X- and Y-directions by the X, Y-axes control device 134 while the photosetting resin is jetted from the first and second heads 134a and 134b.

Figure 11:
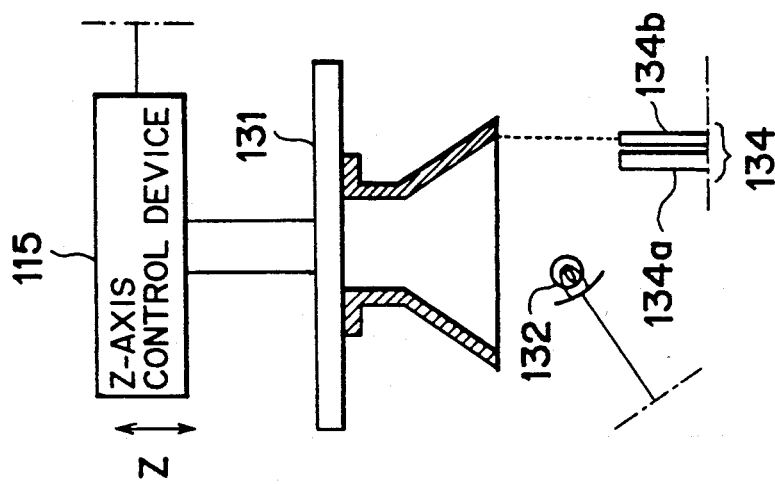
FIGS. 10 and 11 are explanatory views of the article using an ink jet head unit comprising at least two ink jet heads having different jetting amount of the material which is used in the three-dimensional article forming apparatus of this invention.

As shown in FIG. 10, a part of the article which corresponds to a bulky and visually-hidden portion of the article is formed using the first head 134a having a large jetting amount for the photosetting resin. On the other hand, as shown in FIG. 11, another part of the article which constitutes the visually-exposed surface of the article or requires a fine color adjustment, is formed using the second head 134b having a small jetting amount for the photosetting resin. The photosetting resin is jetted to the forming stage 28 from the respective ink jet heads and laminated on the forming stage 28 every layer under the forming process. Thereafter, the laminated photosetting resin is photocured by the light source 132.

According to the three-dimensional article forming apparatus of this embodiment, the ink jet head having the small jetting amount for the photosetting resin is used for parts of the article which need a fine ink jet operation, and another ink jet head having a large jetting amount for the photosetting resin is used for other parts of the article which are large in area and volume or bulky parts of the article which are visually hidden, so that a three-dimensional article is efficiently formed and a time for a forming process is reduced.

Any modifications may be made to the above embodiment insofar as the modifications do not depart from the subject matter of this invention. For example, the number of ink jet heads constituting each array and the number of kinds or colors of the photosetting resins are not limited to these as described above.

When a cylindrical or a cup-shaped article is formed by the three-dimensional article forming apparatuses as described above, there are required four kinds of positional controls for a driving of the stage 131 in the Z-axis direction, two drivings of the ink jet heads 116 to 118 in the X- and Y-directions, and a rotational driving of the ink jet heads 119 to 121 on a plane parallel to the X-Y plane, so that a mechanism for performing the forming process is complicated and it takes a long time for a processing of the control unit 111 and for obtaining the coordinate data. Accordingly, a time required for forming an article is wholly increased.

The following embodiment is capable of simplifying the positional control, reducing the time for processing the coordinate data and forming not only a block article, but also a cylindrical article for a short time.

Figure 12:
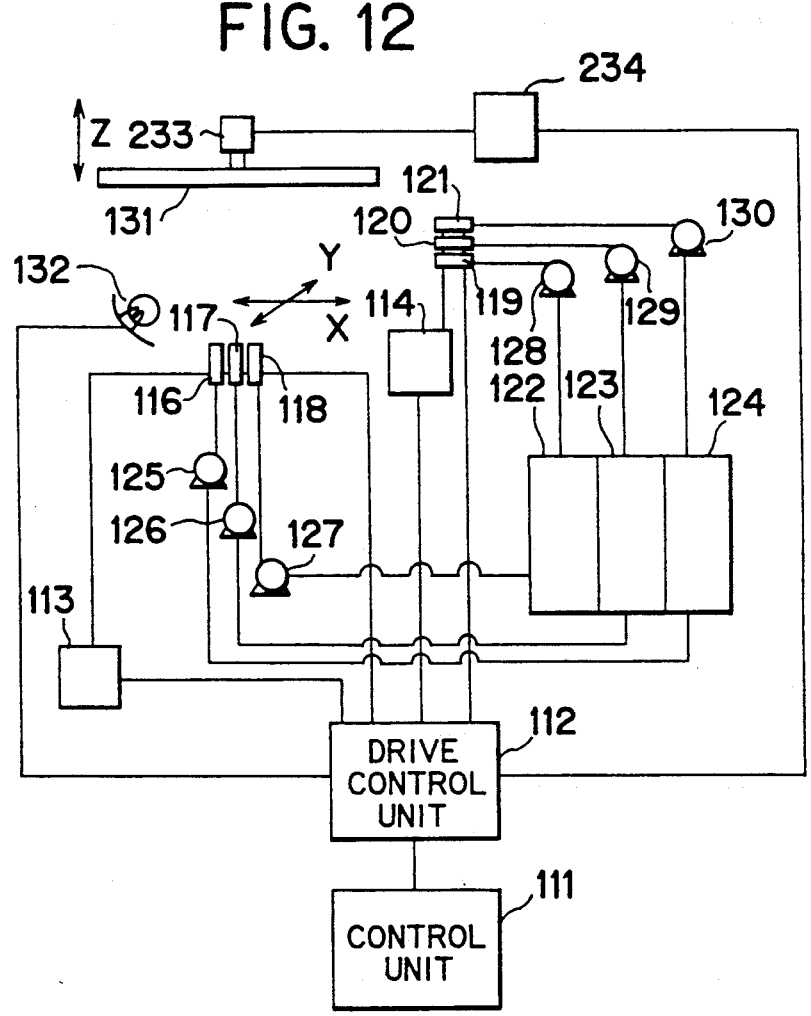
FIG. 12 is a schematic view of a fourth embodiment of the three-dimensional article forming apparatus according to this invention to which a driving unit for rotating the stage is provided.

As shown in FIG. 12, the three-dimensional article forming apparatus according to this embodiment has a substantial construction of the ink jet type of three-dimensional article forming apparatus as described above, and in addition to the above construction, the apparatus further includes a mechanism for rotating the forming stage around the axis perpendicular to the plane of the stage.

Figure 13:
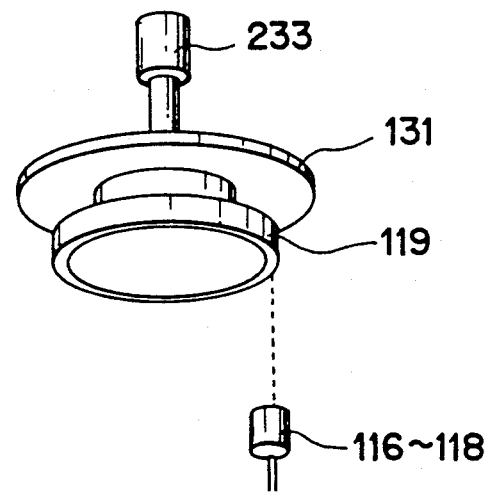
FIG. 13 is an enlarged view of a article forming portion of the apparatus as shown in FIG. 12.

An operation of the three-dimensional article forming apparatus is also substantially similar to that of the ink jet type of three-dimensional article forming apparatus, except that a stage driving device 233 as shown in FIG. 13 for moving the forming stage 131 in the Z-direction and rotating the forming stage 131 around the axis perpendicular to the surface of the stage 131 is further provided to the apparatus. In the apparatus of this embodiment, in accordance with instructions from the control unit 111 and the drive control unit 112, the stage driving device 233 rotates the forming stage 131 and moves it in the Z-direction through a rotational and Z-axis movement control device 234. In this embodiment, it is not necessary to move the ink jet heads 119 to 121 because the forming stage 131 is rotated. Further, it is sufficient to carry out a control for only one axis of the X- and Y-directions as the position control of the ink jet heads 116 to 118 because the forming stage 131 itself is rotated.

In the three-dimensional article forming apparatus thus constructed, the X, Y-axes control device 113 and the stage driving device 233 are driven while the drops of photosetting resin are jetted from the ink jet heads toward the stage in accordance with the data input from an external source, and the drops of the photosetting resin are photocured by light-radiation from the light source 132 to form a resin article. In this case, not only articles having a block shape and a box shape, but also an article having a cylindrical or cup shape can be formed by an easy control because the stage is rotated and the photosetting resin is laminated in synchronism with the rotation of the stage.

Of course, the rotational movement control device 114 may be used together with the stage driving device 233. In this case, an article having a simple shape such as a box type article may be formed using the rotational movement control device 114 in place of the stage driving device 233.

According to this embodiment, the control mechanism for driving the ink jet heads can be simplified because the forming stage of the three-dimensional article forming apparatus is rotated. Accordingly, an article having a complicated shape such as a cup shape, a cylindrical shape or the like can be easily and accurately formed for a short time. Further, the apparatus can be designed to be small in size and light in weight, and the cost of forming the apparatus and the time for forming an article can be reduced.

FIGS. 14 to 17 show explanatory views for forming an article having a further complicated shape, for example, using the apparatus as shown in FIG. 7. This embodiment uses a mesh sheet on which a photosetting resin is laminated and photocured by light-radiation.

Figure 14:
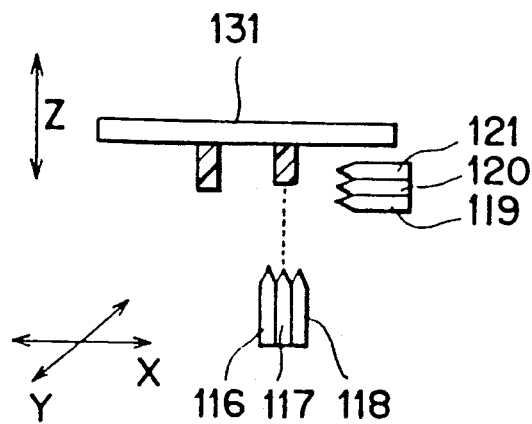
FIGS. 14 to 17 are explanatory views of forming a three-dimensional article having a complicated shape using the apparatus as shown in FIG. 7 and a mesh sheet.
Figure 15:
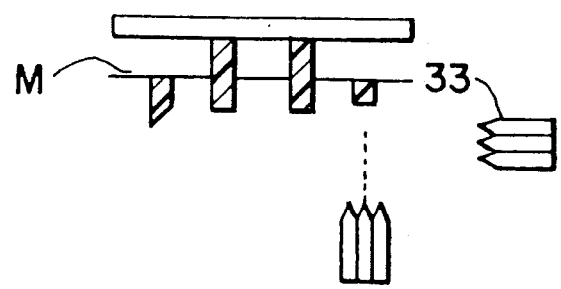
Figure 16:
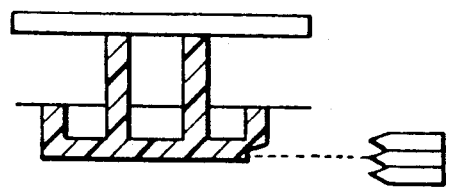
Figure 16:
Figure 17:
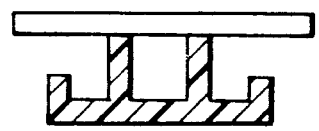
Figure 17:

As described above, the photosetting resin jetted from the ink jet head is laminated on every layer, and then is photocured by the light-radiation. As shown in FIG. 14, a first layer of the photosetting resin is laminated on the stage 131 and exposed to light by the light source 132 to be photocured. The forming stage 131 is moved in the Z-direction by a distance corresponding to one layer by the Z-axis control device 115 while laminating and photocuring processes are repeated every layer. The thickness of each layer of the resin is dependent on the jetting amount, the viscosity, the specific gravity, the surface tension or the like of the resin. After the photosetting resin is laminated by a predetermined thickness, a mesh sheet M formed of the same material as the photosetting resin is disposed on the laminated photosetting resin which has been formed, and then the photosetting resin is further laminated on the mesh sheet M as shown in FIG. 15. This mesh sheet M enables a forming process for an article having a complicated shape such as an article having a rim portion as shown in FIG. 15. The jetting operation of the ink jet head and the exposure process of the light source 132 are continued until an article as shown in FIG. 14 is formed. After the article as shown in FIG. 14 is formed, the undesired mesh sheet M is removed by a post-treatment to complete the article as shown in FIG. 17.

If the mesh sheet is disposed on a (n)th layer of the resin and then the resin is laminated on the mesh sheet, a (n+1)th layer of the resin having a larger area than the (n)th layer can be made in the above process.

When the mesh sheet comprises the same photosetting resin to be used for forming the article, the article which has been finally completed has an homogeneous construction and thus the article has an excellent construction in appearance and strength. Further, if the mesh sheet comprises a half-cured photosetting resin and a light exposure is limited to only the laminated photosetting resin, the sheet can be easily removed. In a case where the article has a specific shape, by suitably selecting for the mesh sheet a specific material which is dissolved by a specific solvent serving as a removing solvent, an undesired portion of the mesh sheet can be dissolved by the solvent and thus easily removed during a finishing treatment. Still further, if a focusing optical system is adopted as an optical system for supplying the light emitted from the light source to the forming stage, it is not necessary to intermittently carry out an exposure process for exposing the laminated photosetting resin to light every jetting operation of the photosetting resin, and thus the exposure process can be sequentially carried out.

This embodiment is not limited to the above construction, and any modifications may be made insofar as the modifications do not depart from the subject matter of this invention. For example, the mesh sheet is not necessarily formed of the same material as the material used for the article, and may be formed of a material which has a mechanical strength to some extent and can be cut off from the article.

Further, at a stage where the lamination of the photosetting resin in the horizontal direction is carried out, the mesh sheet is disposed on the previously-laminated layer of the resin, and the photosetting resin vertically jetted from the ink jet heads 116 to 118 may be laminated along the mesh sheet in place of horizontally jetting the resin from the ink jet heads 119 to 121. In this case, the ink jet heads 119 to 121 are not necessary.

In the apparatuses as described above, the photosetting resin laminated on the forming stage is exposed to light so that the resin is subjected to a photoreaction such as a photopolymerization. The photopolymerization is carried out by a radical polymerization which is inhibited by the presence of the oxygen. That is, the photocuring process proceeds at a lower rate in air, and thus a loss of light energy to be used for the exposure process is increased and an efficiency of the forming process is reduced.

Figure 18:
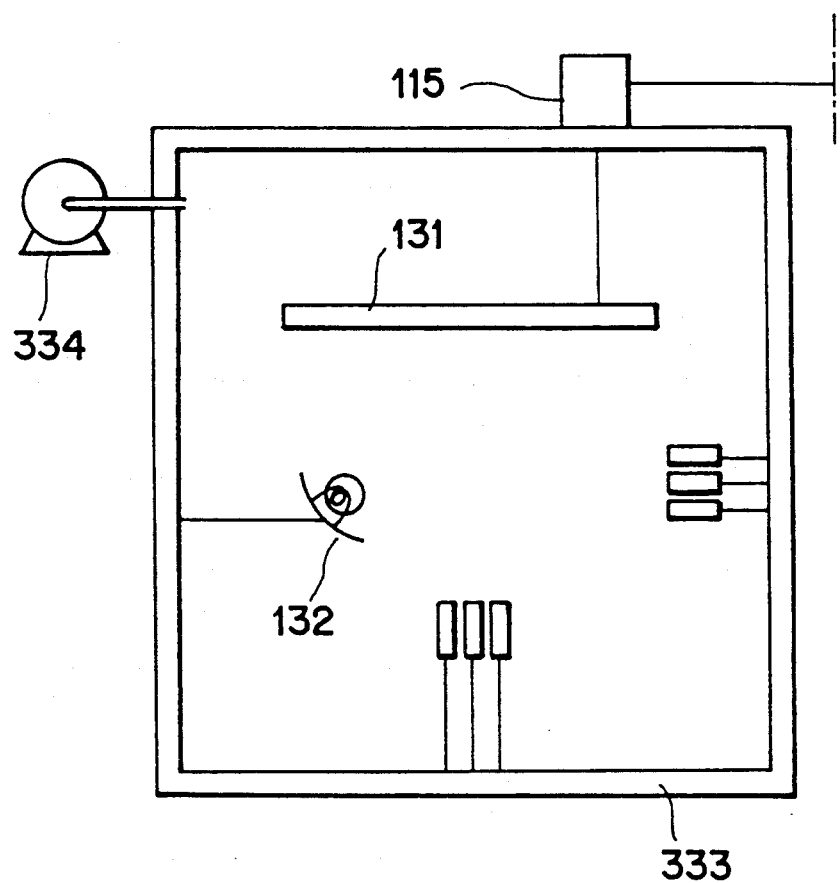
FIG. 18 shows a fifth embodiment of the three-dimensional article forming apparatus having an article forming chamber.

FIG. 18 shows a fifth embodiment of the three-dimensional article forming apparatus according to this invention capable of overcoming the above disadvantage.

The apparatus of this embodiment has a chamber for accommodating an article forming portion of the apparatus, That is, the chamber 333 accommodates at least the forming stage 131 and the ink jet heads. The light source 132 may be disposed within the chamber 333 or at the outside of the chamber 333. The disposing place of the light source 132 is determined case by case. The chamber 333 has an oxygen removing unit 334 such as a vacuumizing mechanism such as a vacuum pump for vacuumizing the inside of the chamber 333, or an inert gas substituting mechanism 334 for substituting the air within the chamber 333 for an inert gas such as $N_2$, He and Ar. Accordingly, the oxygen in the chamber 333 is removed from the chamber 333 and the affection of the oxygen on the photopolymerization reaction can be removed, so that an article can be formed of the photosetting resin for a shorter time.

If the three-dimensional article forming process as described above is applied to form a mold in place of the conventional mold forming method such as the lost-wax process or the like, the disadvantages of the conventional mold forming method are completely overcome.

Figure 19:
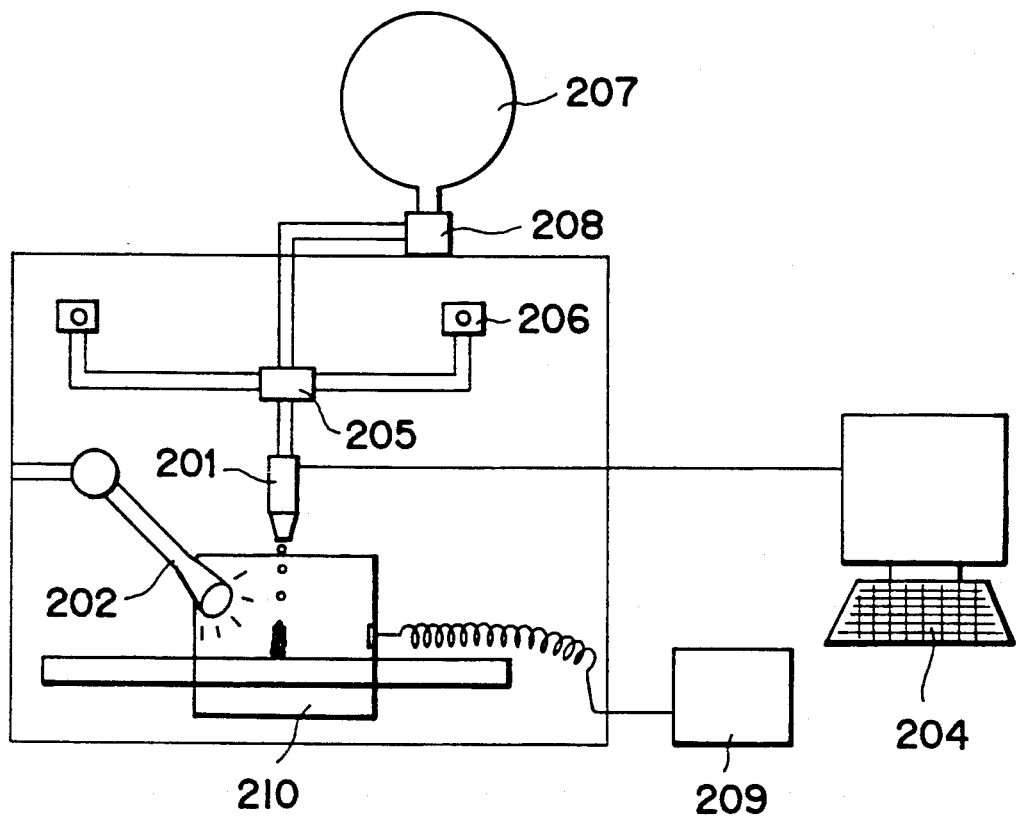
FIG. 19 is a schematic view of a sixth embodiment of the three-dimensional article forming apparatus according to this invention, particularly to form a simple mold used for a molding process.
Figure 20:
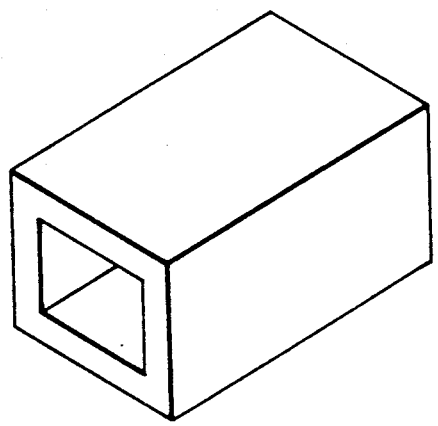
FIG. 20 is a perspective view of the mold which is formed by the apparatus as shown in FIG. 14.

FIG. 19 is an explanatory diagram for showing an apparatus for forming a simple mold to which the subject matter of this invention is applied, and FIG. 20 shows an example of the mold which is formed by the apparatus as shown in FIG. 19.

First, the whole construction of the apparatus will be described with reference to FIG. 19.

An apparatus of this embodiment comprises an ink jet nozzle 201 for jetting a photosetting resin curable, for example, by an ultraviolet ray, an ultraviolet lamp 202 for emitting ultraviolet ray, a forming stage 203, a control device 204, an X-axis direction moving device 205 for moving the ink jet nozzle 201 in the X-direction, a Y-axis direction moving device 206 for moving the ink jet nozzle 201 in the Y-direction, a tank 207 for accommodating the photocurable resin, a pump 208 for supplying the photosetting resin accommodated in the tank 207 to the ink jet nozzle 201, a safety device 209 and a door 210.

An operation of the apparatus as shown in FIG. 19 will be described hereunder in a case where a solid article having a hollow as shown in FIG. 20 is formed.

Information on the shape of a desired article is firstly input to the control device 204. Next, upon closing the door 210 of this apparatus, the safety device 209 is switched to an on-state to keep this apparatus at a operable state. Thereafter, the ink jet nozzle 201 is supplied with a control signal from the control device 204 and moved to a predetermined position. The photosetting resin is supplied from the tank 207 through the pump 208 to the ink jet nozzle 201, and is jetted from the ink jet nozzle 201 on the stage 203 to be laminated thereon. At this time, the photosetting resin is exposed to ultraviolet ray by the ultraviolet lamp 202 to be photocured. The ink jet nozzle 201 is moved by the X-axis moving device 205 and the Y-axis moving device in accordance with the signal transmitted from the control device 204 while the photosetting resin is jetted from the ink jet nozzle 201, and the photosetting resin is continued to be laminated and photocured by the ultraviolet ray to obtain the solid article. In this case, it takes 5 minutes to complete the process.

The photosetting resin used in this embodiment is selected in consideration of viscosity, rate of reaction, efficiency and so on, and photosensitizer, stabilizer, reactive diluent are added in a suitable ratio.

This embodiment is not limited to the above construction, and various modifications may be made insofar as the modifications do not depart from the subject matter of this invention. Of course, a Z-direction moving device for moving the stage or the ink jet nozzle in the Z-direction may be added to this apparatus.

For example, when a material soluble in a specific solvent is used as the photosetting resin and a solid article is formed within the mold which is formed of the photosetting resin by the method of the above embodiment, the article can be easily obtained by solving the mold formed of the photosetting resin with the specific solvent. Similarly, when a thermoplastic photosetting resin curable by ultraviolet ray is used, the article can be obtained by melting the mold with heat.

As is apparent from the above, in the mold forming method of this embodiment, the photosetting resin is jetted, laminated and photocured by light-radiation while the photosetting resin is positionally moved along or toward the surface of the stage in accordance with the solid article forming information to form an article having desired shape. Accordingly, in comparison with the conventional method, a simple mold is more easily and safely obtained for a shorter time, at a lower cost, and with a higher accuracy.

According to this invention, since an ink jet head unit having at least one ink jet head is used for forming a three-dimensional article, a material used for forming the article can be easily exchanged for another material even during an article forming process. Further, as the material is jetted in a droplet form, polymerization of the material is easily controlled.

Further, according to this invention, the ink jet head unit is disposed under the stage, the material is upwardly jetted from the ink jet head unit to the stage and laminated on the stage, and then is photocured every jetting process. Accordingly, there is an advantage that a material for which the previously used material is exchanged during the forming process is not mixed with the previously used material, and thus the forming process is accurately performed with no dripping or blurring of the material on the stage.

Still further, according to this invention, when the ink jet head unit has plural ink jet heads for accommodating different kind or color materials for the article, a multi-kind or multi-color three-dimensional article can be easily formed for a short time without a cleaning process.

Still further, according to this invention, each ink jet head of the ink jet head unit has at least two heads one of which has a small jetting amount for the material and is used for parts of the article requiring a fine jet operation, and the other of which has a large jetting amount for the material is used for other parts of the article large in area and volume or a visually-hidden bulky part of the article, so that a three-dimensional article is efficiently formed and a time for a forming process is reduced.

What is claimed is:

1. An apparatus for forming a three-dimensional article with curable material based on three-dimensional information on the article, comprising:

a stage for mounting thereon the three-dimensional article to be formed;

an ink jet head unit for jetting the curable material in a droplet form along a flight passage of the material to said stage to laminate the curable material on said stage, the flight passage being defined between said stage and said ink jet head unit, said ink jet head unit comprising at least two ink jet heads having different jetting amounts for the material, one of said ink jet heads having a large jetting amount for jetting the material to form a bulky portion of the article and another of said ink jet heads having a small jetting amount for jetting the material to form a fine portion of the article;

an exposure unit for exposing the laminated material on said stage to light to cure the material; and a control unit for changing at least one of a jetting direction of the material jetted along the flight passage and a jetting amount of the material jetted from said ink jet head unit based on the information to thereby control a jetting operation of the material.

2. An apparatus as claimed in claim 1, wherein said ink jet head unit comprises at least two arrays of ink jet head for laminating the material on the stage in different directions to each other, respectively.

3. An apparatus as claimed in claim 2, wherein said control unit includes first driving means for moving each of said arrays in two directions vertical to each other on a plane parallel to the surface of said stage, and second driving means for moving said stage in a direction vertical to the plane.

4. An apparatus as claimed in claim 2, wherein said control unit includes first driving means for moving one of said arrays in two directions vertical to each other and second driving means for rotating the other array relatively to said stage around an axis vertical to the surface of said stage.

5. An apparatus as claimed in claim 4, wherein said control unit further includes third driving means for moving said stage in a direction vertical to the plane.

6. An apparatus as claimed in claim 4, wherein said control unit further includes third driving means for moving said stage in a direction vertical to the plane and rotating said stage around the axis.

7. An apparatus as claimed in claim 1, further comprising auxiliary exposure means for irradiating light to the flight passage to partly photocure the material flighting along the flight passage.

8. An apparatus as claimed in claim 7, wherein said auxiliary exposure means comprises plural optical fibers having one end of each disposed in such a manner as to confront the flight passage of the material, and a light source disposed in such a manner as to confront the other end of each of said optical fibers.

9. An apparatus as claimed in claim 1, further comprising oscillating means for oscillating the material before the material is jetted from said ink jet head unit, to thereby prevent clogging of the material in said ink jet head.

10. An apparatus as claimed in claim 9, wherein said oscillating means comprises a piezoelectric element.

11. An apparatus as claimed in claim 1, wherein said ink jet head unit is disposed under said stage so as to upwardly jet the material to the stage.

12. An apparatus for forming at least one of a multi-kind and a multi-color three-dimensional article with plural curable materials of different kinds or colors based on three-dimensional information on the article, comprising:
a stage for mounting thereon the three-dimensional article to be formed;
plural tanks for accommodating the different kinds or colors of materials;
an ink jet head unit having plural ink jet heads for jetting the respective curable materials in a droplet form along a flight passage of the materials to said stage to individually laminate the curable materials on said stage, the ink jet heads having different jetting amounts for the material, the flight passage being defined between said stage and said ink jet head unit, one of said ink jet heads having a large jetting amount for jetting the material to form a bulky portion of the article and another of said ink jet heads having a small jetting amount for jetting the material to form a fine portion of the article;
an exposure unit for exposing the laminated materials on said stage to light to cure the materials; and
a control unit for changing at least one of a jetting direction of the material jetted along the flight passage and a jetting amount of the material jetted from said ink jet head unit on the basis of the information to thereby control a jetting operation of the material.

13. An apparatus as claimed in claim 1, wherein the three-dimensional information on the article comprises plural sectional positional data each representing a sliced sectional part of the article and color data representing a color of the article to be formed.

14. An apparatus as claimed in claim 1, further comprising a chamber for accommodating said stage and said ink jet head unit.

15. An apparatus as claimed in claim 14, wherein said chamber has means for vacuuming the inside of said chamber.

16. An apparatus as claimed in claim 14, wherein said chamber has means for substituting air within said chamber for an inert gas.

17. A method for forming a three-dimensional article with curable material on the basis of a three-dimensional information on the article, comprising the steps of:
laminating the material on a stage by an ink jet method at each of a plurality of layers;
changing at least one of a jetting direction and a jetting amount of the material jetted from the stage in accordance with the information using at least two ink jet heads having different jetting amounts for the material, thereby controlling a jetting operation of the material;
jetting a large amount of the material to form a bulky portion of the article and jetting a small amount of the material to form a fine portion of the article; and
exposing the laminated material to light to cure the material, thereby forming the article.

18. A method as claimed in claim 17, wherein said laminating step comprises the steps of disposing a mesh sheet on a previously-laminated layer of the photosetting resin on the stage, and laminating a next layer of the photosetting resin on the mesh sheet 19. A method as claimed in claim 18, further comprising the step of removing an undesired portion of the mesh sheet after forming the article.

* * * * *